United States Patent
Stafford et al.

(10) Patent No.: US 9,529,412 B2
(45) Date of Patent: Dec. 27, 2016

(54) SYSTEM FOR REDUCING ENERGY CONSUMPTION OF A DEVICE AND A METHOD THEREFOR

(71) Applicant: Time Warner Cable Enterprises LLC, New York, NY (US)

(72) Inventors: Roger Stafford, Waxhaw, NC (US); Edward P. Galt, Boulder, CO (US)

(73) Assignee: TIME WARNER CABLE ENTERPRISES LLC, New York, NY (US)

(*) Notice: Subject to any disclaimer, the term of this patent is extended or adjusted under 35 U.S.C. 154(b) by 67 days.

(21) Appl. No.: 14/614,966

(22) Filed: Feb. 5, 2015

(65) Prior Publication Data

US 2015/0153816 A1    Jun. 4, 2015

Related U.S. Application Data

(62) Division of application No. 13/408,163, filed on Feb. 29, 2012, now Pat. No. 9,026,826.

(51) Int. Cl.
*G06F 1/32* (2006.01)
*H04N 21/443* (2011.01)

(52) U.S. Cl.
CPC ........... *G06F 1/3287* (2013.01); *G06F 1/3206* (2013.01); *H04N 21/4436* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | |
|---|---|---|---|
| 5,793,125 A | 8/1998 | Tarng | |
| 8,181,043 B1 | 5/2012 | Reynolds | |
| 8,269,376 B1 | 9/2012 | Elberbaum | |
| 2006/0271214 A1 | 11/2006 | Brown | |
| 2009/0070616 A1 | 3/2009 | Yeh | |
| 2009/0106571 A1 | 4/2009 | Low et al. | |
| 2010/0148591 A1 | 6/2010 | Lim | |
| 2010/0164284 A1 | 7/2010 | Lee et al. | |
| 2010/0169677 A1 | 7/2010 | Madhusoodanan | |

(Continued)

*Primary Examiner* — Zahid Choudhury
(74) *Attorney, Agent, or Firm* — The Marbury Law Group, PLLC

(57) ABSTRACT

A system for reducing energy consumption of a device and a method therefor. An apparatus for providing power to a controlled device includes a memory, a power controller, and a processor. The processor receives switching data from the memory. The switching data may include at least one on time and at least one off time. The processor generates a connect command or a disconnect command from the switching data and issues the command to the power controller. The power controller connects a power source interface to a power output interface. A power source is also connected to the power source interface. The power output interface is connected to a power input of the controlled device. The power controller connects the power output interface to the power source interface in response to a connect command and disconnects the power output interface from the power source interface in response to the disconnect command.

16 Claims, 3 Drawing Sheets

(56) References Cited

U.S. PATENT DOCUMENTS

| | | |
|---|---|---|
| 2010/0280671 A1 | 11/2010 | Lee |
| 2011/0145808 A1 | 6/2011 | Mountain et al. |
| 2011/0150431 A1* | 6/2011 | Klappert ................ H04N 7/163 |
| | | 386/296 |
| 2011/0320057 A1* | 12/2011 | Newell ................ G06F 1/3203 |
| | | 700/296 |
| 2012/0119577 A1 | 5/2012 | Clarke |
| 2012/0191980 A1 | 7/2012 | Kennedy et al. |
| 2012/0246497 A1 | 9/2012 | Amadeu |
| 2013/0031541 A1 | 1/2013 | Wilks et al. |
| 2013/0227323 A1 | 8/2013 | Stafford et al. |
| 2013/0261821 A1 | 10/2013 | Lu et al. |

* cited by examiner

SYSTEM FOR REDUCING ENERGY CONSUMPTION OF A DEVICE AND A METHOD THEREFOR

This application is a divisional application of and claims the benefit of priority to U.S. non-provisional patent application Ser. No. 13/408,163, entitled "A SYSTEM FOR REDUCING ENERGY CONSUMPTION OF A DEVICE AND A METHOD THEREFOR", filed Feb. 29, 2012, the entire contents of which are hereby incorporated by reference in their entirety.

BACKGROUND

Multi-media services are provided to businesses and residences via networks that connect content sources to terminal devices that render the content for consumption. For example, television programming and audio content may be provided over cable networks, satellite networks, and fiber networks. The network, whatever medium it uses, terminates in a rendering device or system of devices that consume electrical power.

For example, multimedia service providers have deployed millions of network service devices, such as top boxes, satellite receivers and DVRs, that are always fully powered. The powered-on state is necessary to allow the network service device to receive targeted firmware downloads and electronic messages. For example, an electronic message sent to a set top box may include conditional-access security keys that facilitate video and audio decode and software downloads.

A typical set top box consumes between thirty and forty watts. At best, a typical set top box may operate in a mode in which the panel lights are dimmed, saving about two watts. In these devices, the physical limitation of the hardware design means that low power states cannot be achieved through improvement in software.

Recently, customer products have been provided with power supplies that may provide functionality to control the power state of the device in order to increase the time between battery charges. However, applying these concepts to network service devices has been difficult because of the need for the termination device to be responsive to both a user and a network operator. Thus, even network service devices that are capable of entering into low power states fail to achieve meaningful power savings.

SUMMARY

Embodiments herein are directed to reducing the energy consumption of a controlled device.

In an embodiment, an intelligent in-line switch is interposed between the AC power cord of a controlled device and a power outlet. The in-line switch permits that controlled device to be powered down, either manually or using a stored time-schedule. In another embodiment, the in-line switch may be connected to an external network that allows the in-line switch to be controlled to override a manual or timed activity.

In another embodiment, a controlled device comprises a programmable circuit controller that is responsive to software implemented state commands to control individual circuits or sub-systems within the controlled device. By way of illustration and not by way of limitation, a controlled device may be a set top box, a satellite receiver, a digital video recorder (DVR) and a television.

DETAILED DESCRIPTION

As used herein, "controlled device" encompasses customer premises equipment that is connected to a service provider network. For example, a controlled device may include a set top box, a satellite receiver, a digital video recorder (DVR) and a television.

As used herein, "network service provider" encompasses an operator of a network that terminates in a controlled device.

Figure 1:
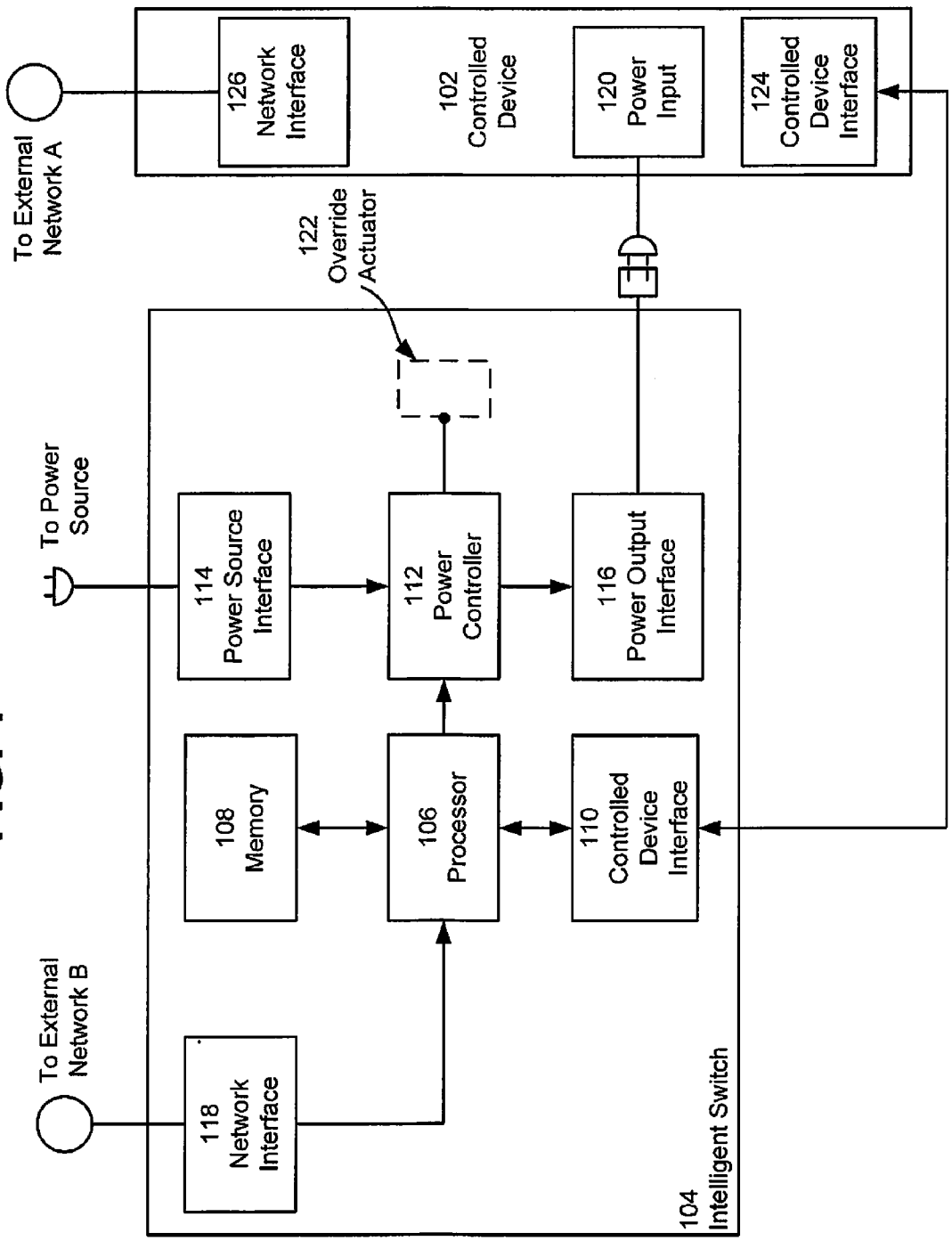
FIG. 1 is a block diagram illustrating an intelligent switch according to an embodiment.

FIG. 1 is a block diagram illustrating an intelligent switch according to an embodiment.

A controlled device 102 is connected to an intelligent switch 104. The intelligent switch comprises a processor 106, a memory 108, a controlled device interface 110, a power controller 112, a power source interface 114, a power output interface 116, a network interface 118 and an override actuator 122.

The power controller 112 is responsive to commands from the processor 106 to switch power supplied to the power source interface 114 from a power source (not illustrated) to a power output interface 116. The controlled device 102 receives power from the power output interface 116 via a power input 120. By way of illustration and not by way of limitation, the controlled device may be a set top box, a satellite receiver, a digital video recorder (DVR), a personal video recorder (PVR) or a television set. The power source may be a source of alternating current or a source of direct current. The controlled device 102 may or may not have internal power-saving features. The features of the intelligent switch 104 add power control to devices that do not have internal power-saving features, and provide additional control of devices that possess some native form of power management.

In an embodiment, the memory 108 includes software instructions that are executed by the processor 106 and switching data. The switching data are accessed by the processor 106 and processed according to the software instructions to determine a state of the power controller 112. By way of illustration, the switching data may include time periods when the controlled device 102 must be powered on to receive targeted firmware downloads and electronic messages that are received from network A via interface 126. By way of illustration and not by way of limitation, an electronic message for a set top box may include conditional access security keys that facilitate video and audio. An electronic message may also include software for running applications. The switching data may also include time periods when the controlled device 102 may be powered off, thereby significantly reducing its average power consumption.

The switching data and/or the software instructions may be provided to the controlled device 102 by a network service provider via network interface 118 that connects to network A. By way of illustration and not by way of limitation, the network A may be a subscriber network provided over a wire medium, a fiber medium, a wireless medium, or a combination of mediums.

The switching data and/or the software instructions may be provided by the controlled device 102 to the memory 108 via the controlled device interface 110 operating on the intelligent switch 104 and the controlled device interface 124 operating on the controlled device 102. By way of illustration and not by way of limitation, the controlled device interfaces 110 and 124 are USB ports. When the controlled device 102 is in the on state and fully functional, the controlled device interfaces 110 and 124 may be used to serially download a daily on-off schedule to the memory 108. The schedule is sent to the memory 108 from the controlled device 102.

In another embodiment, the switching data and/or the software instructions may be provided to the memory 108 by a network service provider via network B through the network interface 118. By way of illustration and not by way of limitation, network B may be a packet network provided over a wire medium, a fiber medium, a wireless medium, or a combination of mediums. In an embodiment, network B is the Internet.

The path to network B may also be used to issue an override command to the intelligent switch 104. For example, the override command may be issued by a network service provider to schedule an unplanned software upgrade or a programming change or it may be issued in response to a request by a user of the controlled device for multimedia service. The override command may be issued via network B in the event that the path via network A is interrupted or if the controlled device 102 is in a fully off state.

The switching data may also be provided, at least in part, by a user of the controlled device 102. In an embodiment, the user of controlled device 102 accesses a configuration web page that allows the user to create an on-off schedule. The on-off schedule is provided to the memory 108 as previously described. In an embodiment, the web page may be served by a web server (not illustrated) operated by the network service provider. In an embodiment, the time periods selected by the user may be overridden by time periods established by the network service provider. In this embodiment, the processor 106 may be configured to afford priority to any time period selected by the network service provider.

The intelligent switch 104 comprises an override actuator 122. The override switch by-passes the power controller 112 to control the controlled device 102 without regard to the program instructions stored in memory. By way of illustration and not by way of limitation, the override actuator is a manual switch that may be toggled to send a command to the power controller 112 to change the current state of the power controller 112. Thus, if the power controller 112 is in an "ON" state, engaging the override actuator 122 instructs the power controller to enter an "OFF" state. If the power controller 112 is in an "OFF" state, engaging the override actuator 122 instructs the power controller to enter an "ON" state.

In yet another embodiment, the number of times the override actuator 122 is "tapped" determines the state of the power controller 112. By way of illustration and not by way of limitation, tapping once changes a current state of the power controller 112; tapping twice changes a current state of the power controller 112 but maintains the processor's 106 control over the power controller 112; and tapping thrice leaves the power controller 112 in its current state but disengages the processor's 106 control over the power controller 112. The number of taps and the resulting state are not meant to be limiting but may be configured to achieve a desired result.

In another embodiment, the override actuator 122 is responsive to signals from a remote control device (not shown), such as a remote control device that is configured to control a device connected to the controlled device 102. By way of illustration, when the remote control device is used to turn on a display device (not shown) connected to the controlled device 102, the override actuator 122 receives the power on control command from the remote control device. If the current state of the power controller 112 is in an "OFF" state, the override actuator 122 provides the power on control command to the power controller 112, which enters an "ON" state. If the power controller 112 is in an "ON" state, the override actuator 122 provides the power on control command to the power controller 112, but the power controller 112 takes no action.

In another embodiment, the override actuator 122 comprises a radio-frequency interface, such as an interface that complies with a RF4CE (Zigbee), Wi-Fi or Bluetooth digital protocol. In another embodiment, the override actuator 122 comprises an infra-red (IR) interface. In these embodiments, the override actuator 122 may receive commands from a compatible external source such as a handheld controller, a cell phone or a home-automation system.

Figure 2:
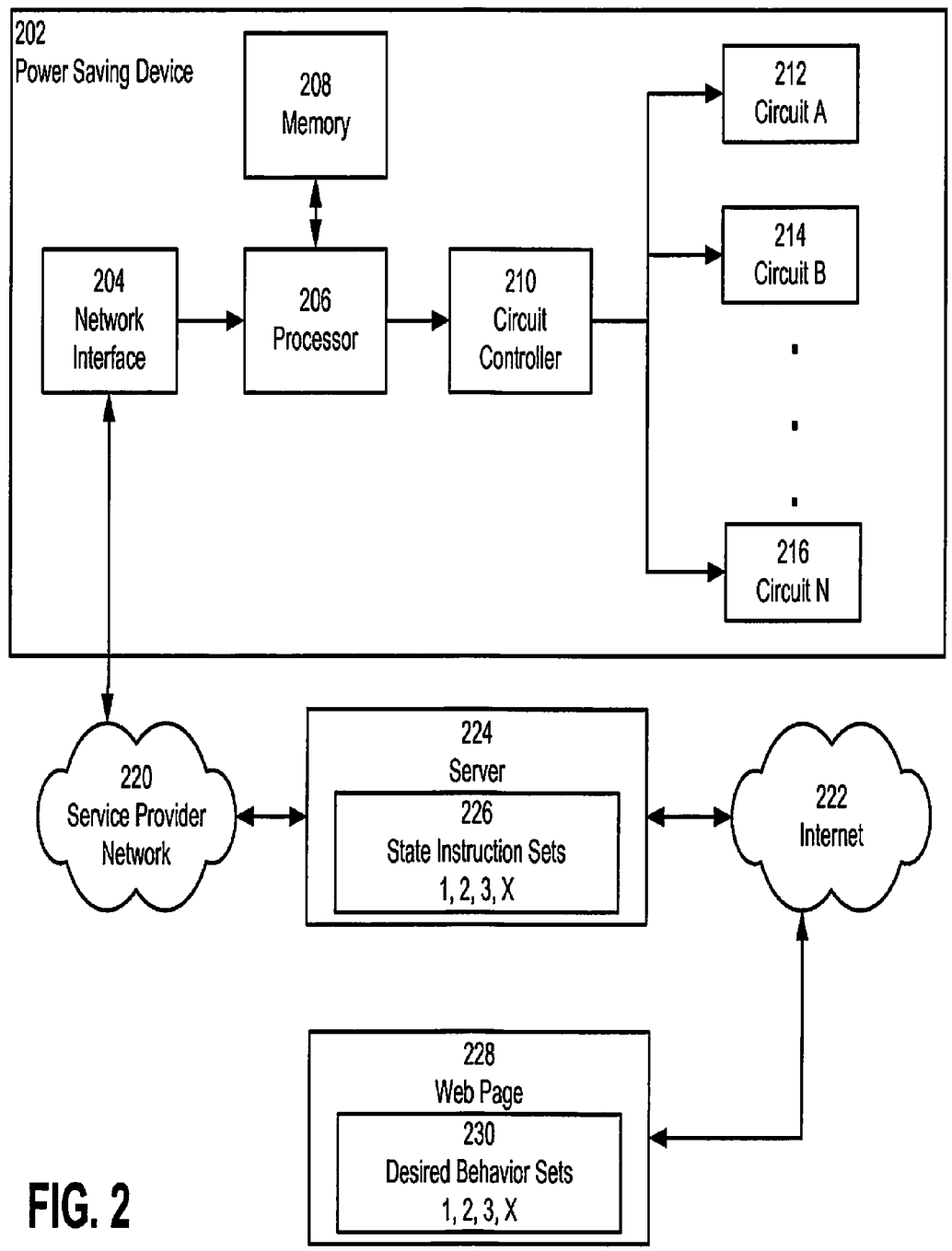
FIG. 2 is a block diagram illustrating a power saving device according to an embodiment.

FIG. 2 is a block diagram illustrating a user interface for controlling a controlled device according to an embodiment.

A power saving device comprises a network interface 204, a processor 206, a memory 208, a circuit controller 210 and circuits A, B and N (212, 214 and 216 respectively). In an embodiment, the circuit controller 210 is responsive to commands issued by the processor 206 to control the power supplied to one or more of circuits A, B and N (212, 214 and 216 respectively). As used herein, a "circuit" encompasses a collection of components that are connected so as to perform one or more discrete functions. By way of illustration and not by way of limitation, a "circuit" may include a video input circuit, a video output circuit, an audio circuit, an input/output circuit, a data storage circuit, a display lighting circuit, a keypad lighting circuit and a communication circuit. By way of illustration and not by way of limitation, control of a circuit may be accomplished by disabling/enabling an input to the circuit, disabling/enabling the output of a circuit, and disabling/enabling power to the circuit or one or more of its components.

By way of illustration and not by way of limitation, the power saving device 202 may be a set top box, a satellite receiver, a DVR, PVR or a television. In an embodiment, the memory 208 comprises software instructions that are executed by the processor 206 and circuit control data. The circuit control data are accessed by the processor 206 and processed according to the software instructions to provide commands to the circuit controller 210. By way of illustration, the circuit control data may include time periods when one or more of circuits 212, 214 and 216 of the power saving device 202 must be powered on to receive targeted firmware downloads and electronic messages. By way of illustration and not by way of limitation, an electronic message for a set top box may include conditional access security keys that facilitate video and audio decoding. An electronic message may also include software for running applications. The circuit control data may also include time periods when one or more of circuits 212, 214 and 216 of the power saving device 202 may be disabled, thereby significantly reducing its average power consumption.

The circuit control data and/or the software instructions may be provided by a service provider network 220 to the memory 208 of the power saving device 202 via the network interface 204. By way of illustration and not by way of limitation, the service provider network is selected from the group consisting of a packet network provided over a wire medium, a fiber medium, a wireless medium, and a combination of mediums.

Referring again to FIG. 2, a server 224 is connected to network interface 204 of the power saving device 202 via service provider network 220. The server 224 serves the web page 228 to a user device (not illustrated) via the Internet 222, which web page comprises selectable options 1, 2, 3 and x (block 230). The selectable options map a set of desired behaviors to state instruction sets 1, 2, 3 and x (block 226) on server 224. The state instruction sets include circuit control data that selectively identify circuits that are to be enabled or disabled to achieve the selected desired behavior. The selectable desired behavior sets and the state instruction sets thus define discrete states (one for each state instruction set) that may be imposed on the power saving device 202. By way of illustration and not by way of limitation, the power saving device 202 is a set top box and the selectable options 230 map to state instruction sets 226 that establish the following discrete states for the set top box:

State 1: Always on and operating. All circuits are enabled and the power saving device 202 is fully functional.

State 2: Default standby state associated with State 1. When the power saving device 202 is operating in State 1 and the power saving device 202 enters the standby mode, whether in response to a user command or command issued by the circuit controller 210, only the front panel is dimmed. Otherwise, the power saving device 202 remains fully functional.

State 3: Video, audio, storage and communication circuits and devices disabled. In this state, all video and audio output circuits are disabled (HDMI, Component Video, Composite Video, S-Video, Left & Right Stereo Audio, S/PDIF audio, In-band and Out of band tuners are deactivated, the hard disk drive is spun-down, and no hard-drive activity such as defragmentation operations, or dual time-shift buffers are permitted. Also, any peripheral circuits such as USB, IEEE1394, and eSATA are disabled and cannot be enabled until the user manually returns to State 1 or the power saving device 202 is instructed by the processor 206 to return the power saving device 202 to State 1.

In an embodiment, when State 3 is selected, the processor may issue commands to return the power saving device 202 to State 1 at preset times and for preset intervals to permit the power saving device 202 to receive new stack firmware, CableCARD firmware, or electronic messages that are being signaled by the head-end infrastructure. After expiration of the preset interval, the power saving device 202 may revert to State 3 until the user manually returns to State 1. In an embodiment, when the power saving device 202 is capable of recording programming according to a schedule, the occurrence of a scheduled recording may also cause the processor to instruct the power saving device 202 to reenter State 1. After the recording is completed, the processor may again instruct the power saving device 202 to enter State 3. This mode offers lower power consumption compared to State 1 and State 2 above.

State 4. Video and audio circuits disabled with limited processor interruption. This mode is similar to State 3, with the exception that the power saving device 202 is awakened by the processor 206 to renew conditional access permissions only. For example, the processor 206 may awaken the power saving device 202 for one hour every twenty-five days, to establish control messaging to the head-end infrastructure to obtain electronic message changes that permit current conditional access keys to remain operational for another thirty days, thus preventing 'Brick Mode' from occurring. Also, the power saving device 202 may receive firmware downloads during that operational time window, and then return to State 4. No scheduled recordings will occur. This state achieves the lowest power consumption of the four total states.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an," or "the," is not to be construed as limiting the element to the singular.

Figure 3:
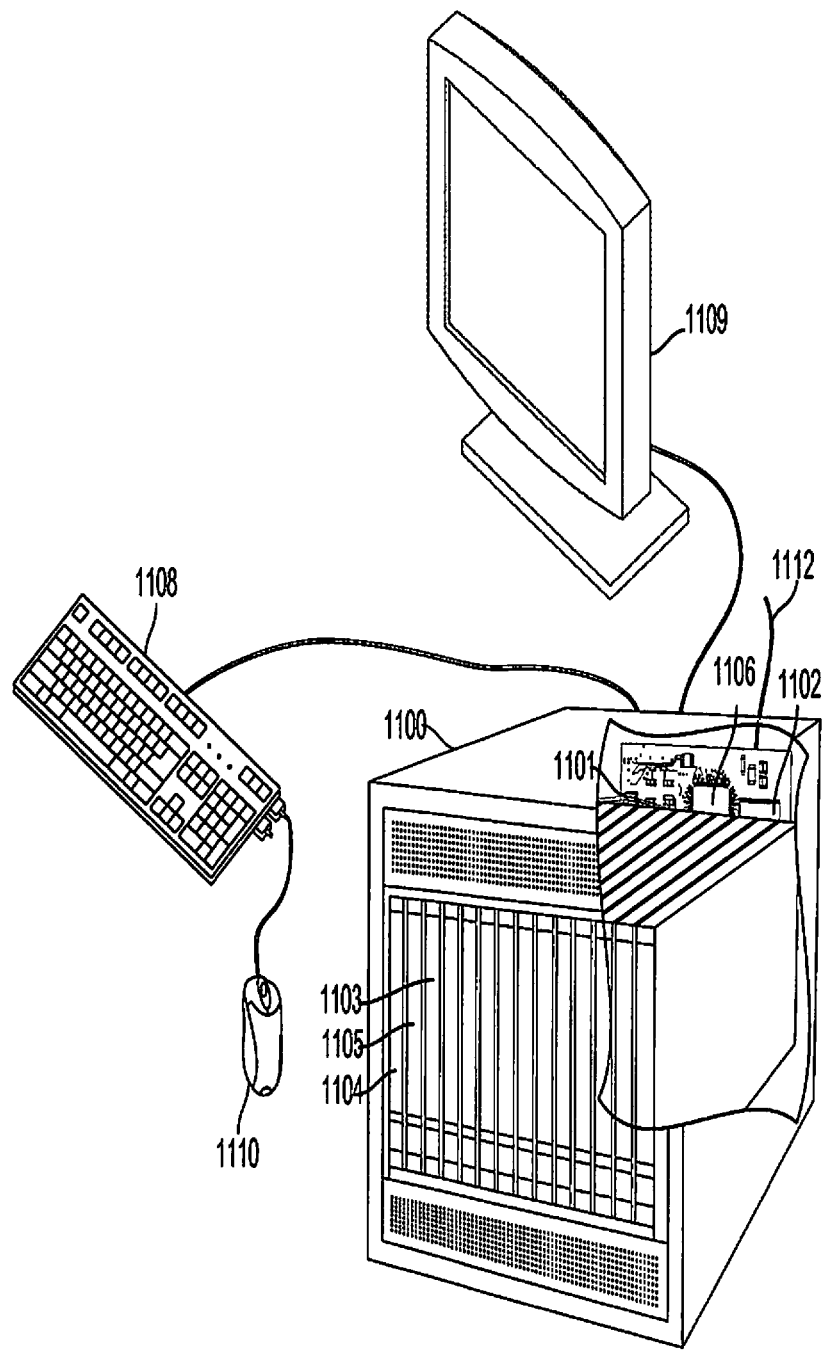
FIG. 3 is a block diagram illustrating a server device.

Certain embodiments, such as those illustrated in FIG. 2, may be implemented on any of a variety of commercially available server devices, such as the server 1100 illustrated in FIG. 3. Such a server 1100 typically includes a processor 1101, for execution of the visibility rules or the performance of the tasks of an email server, coupled to volatile memory 1102 and a large capacity nonvolatile memory, such as a disk drive 1103. The server 1100 may also include a floppy disc drive, compact disc (CD) or DVD disc drive 1104 coupled to the processor 1101. The server 1100 may also include network access ports 1106 coupled to the processor 1101 for establishing data connections with a network 1112, such as a local area network coupled to other broadcast system computers and servers. Server 1100 may also include operator interfaces, such as a keyboard 1101, pointer device (e.g., a computer mouse 1110), and a display 1109.

The processor may be any programmable microprocessor, microcomputer or multiple processor chip or chips that can be configured by software instructions (applications) to perform a variety of functions, including the functions of the visibility rules as illustrated in various embodiments described above.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The receiving and analyzing of signals required by certain embodiments may be performed by one or more devices or systems of devices. The functionality of the electronic hardware used to implement the analytical processes in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function. In one or more exemplary aspects, the functions described may be implemented in hardware, software, firmware, or any combination thereof.

If implemented in software, the functions may be stored as one or more instructions or code on a non-transitory computer-readable medium. The blocks of a method or algorithm disclosed herein may be embodied in a processor-executable software module, which may reside on a non-transitory computer-readable medium. Computer-readable media include computer storage media that facilitates transfer of a computer program from one place to another. Storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A power saving device comprising:
   a memory, wherein the memory comprises software executable instructions;
   a network interface, wherein the network interface is connected to a processor;
   a circuit controller, wherein the circuit controller is connected to the processor and one or more circuits and wherein the circuit controller is responsive to commands from the processor;
   the processor, wherein the processor is configured to execute the software executable instructions to cause the processor to perform operations comprising:
      establishing a first network connection to a network service provider;
      receiving an on-off schedule from the network service provider;
      establishing a second network connection to a web page;
      receiving a selected desired behavior set from the web page over the second network connection;
      mapping the on-off schedule received from the network service provider and selected desired behavior set from the web page to a state instruction set, wherein the state instruction set comprises circuit control data selectively identifying circuits for achieving each of the desired behaviors within the selected desired behavior set and on-off schedule, the circuit control data comprising at least one on time and at least one off time for a circuit;
      selecting one or more identified circuits of the power saving device for controlling based on the state instruction set;
      for each selected circuit;
         generating a command from the state instruction set, wherein the command is selected from the group comprising a circuit disable command and a circuit enable command; and
         issuing the command to the circuit controller, wherein the circuit controller disables operation of each selected circuit for which a disable command has been issued and enables operation of each selected circuit for which an enable command has been issued.

2. The power saving device of claim 1, wherein the network interface is connected to the first network and wherein the circuit control data and the software executable instructions are received via the first network.

3. The power saving device of claim 2, the network is selected from the group consisting of a packet network provided over a wire medium, a fiber medium, a wireless medium, and a combination of mediums.

4. The power swing device of claim 1, wherein establishing the second network connection to the web page further comprises the network interface connecting the processor to a server via the internet, wherein one or more of the circuit control data selected desired behavior set, and state instruction set are received from the server via the internet, and wherein the processor is further configured to execute the software executable instructions to cause the processor to perform operations comprising, for each of the one or more identified circuits, saving the one or more circuit control data, selected desired behavior set, and state instruction set to the memory.

5. The power saving device of claim 4, wherein the processor is configured to execute the software executable instructions to cause the processor to perform operations comprising:
   retrieving the web page from the server;
   serving the web page to a user computer;
   relaying the selected desired behavior set from the user computer to the server; and
   receiving, from the server, the mapping of the selected desired behavior set to the state instruction set.

6. The power saving device of claim 1, wherein the power saving device is selected from the group consisting of a set top box, a satellite receiver, a digital video recorder (DVR), and a television.

7. The power saving device of claim 1, wherein the one more circuits are selected from the group consisting of a video input circuit, a video output circuit, an audio circuit, an input/output circuit, a data storage circuit, a display lighting circuit, a keypad lighting circuit and a communication circuit.

8. The power saving device of claim 1, wherein the operations of enabling and disabling the selected circuit are accomplished by disabling or enabling a connection to the selected circuit selected from the group consisting of an input connection, an output connection, and a power connection.

9. The device of claim 1, wherein the device is selected from the group consisting of a set top box, a satellite receiver, a digital video recorder (DVR), and a television.

10. The device of claim 1, wherein the one more circuits are selected from the group consisting of a video input circuit, a video output circuit, an audio circuit, an input/output circuit, a data storage circuit, a display lighting circuit, a keypad lighting circuit and a communication circuit.

11. The device of claim 1, wherein the steps of enabling and disabling the selected circuit are accomplished by disabling or enabling a connection to the selected circuit selected from the group consisting of an input connection, an output connection, and a power connection.

12. A method for controlling the power consumption of a device comprising:
a memory, wherein the memory comprises software executable instructions;
a network interface, wherein the network interface is connected to a processor;
a circuit controller, wherein the circuit controller is connected to the processor and one or more circuits and wherein the circuit controller is responsive to commands from the processor;
the processor, wherein the processor is configured to execute the software executable instructions to cause the processor to perform operations comprising:
establishing, by the processor, a first network connection to a network service provider;
receiving, by the processor, an on-off schedule from the network service provider;
establishing, by the processor, a second network connection to a web page;
receiving, by the processor, a selected desired behavior set from the web page over the second network connect;
mapping, by the processor, the on-off schedule received from the network service provider and the selected desired behavior set received over the web page to a state instruction set, wherein the state instruction set comprises circuit control data selectively identifying circuits for achieving each of the desired behaviors within the selected desired behavior set, the circuit control data comprising at least one on time and at least one off time for a circuit;
selecting by the processor one or more identified circuits of the device for controlling based on the state instruction set;
for each selected circuit;
generating by a processor a command from the state instruction set, wherein the command is selected from the group comprising a circuit disable command and a circuit enable command; and
issuing by the processor the command to the circuit controller,
disabling by the circuit controller operation of each selected circuit for which is disable command has been issued; and
enabling by the circuit controller operation of each selected circuit for which an enable command has been issued.

13. The method of claim 12, further comprising receiving the circuit control data and the software executable instructions via the first network.

14. The method of claim 13, wherein the network is selected from the group consisting of a packet network provided over a wire medium, a fiber medium, a wireless medium, and a combination of mediums.

15. The method of claim 12, wherein receiving by the processor the selected desired behavior set from the web page over the network connect further comprises receiving one or more of the circuit control data, selected desired behavior set, and state instruction set from a server via the internet; and
for each of the identified one or more circuits, saving the received one or more of circuit contra data, selected desired behavior set, and state instruction set to the memory.

16. The method of claim 15, further comprising:
serving by the server the web page to a user computer;
receiving by the server the selected desired behavior set from the user computer;
mapping by the server the selected desired behavior set to the state instruction set; and
sending by the server the state instruction set to the processor.

* * * * *